G. W. WEEKS.
Ox-Yoke.
No. 21,392.
Patented Aug 31, 1858.
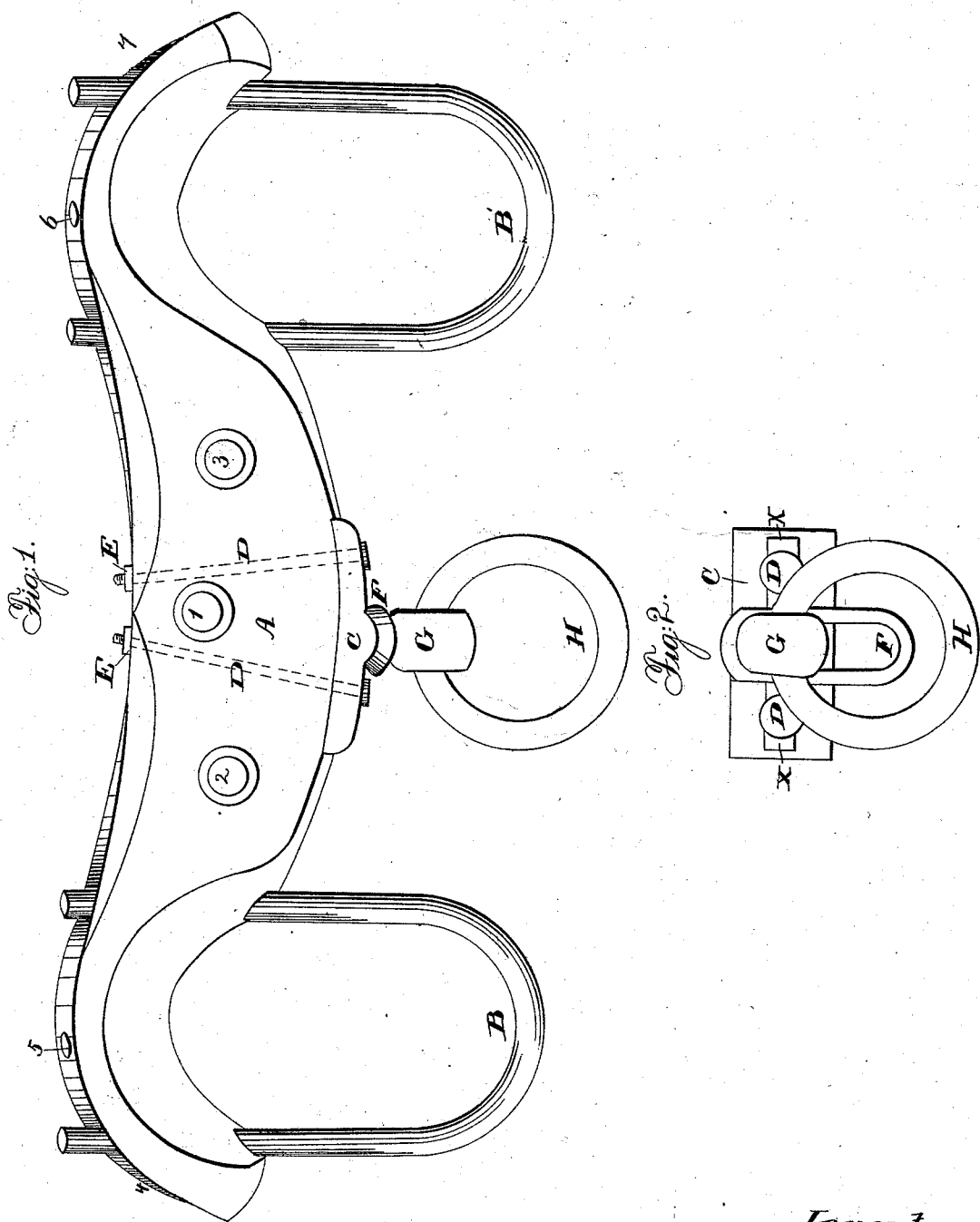
Inventor
G. W. Weeks

UNITED STATES PATENT OFFICE.

GEO. W. WEEKS, OF BOSTON, MASSACHUSETTS.

OX-YOKE.

Specification of Letters Patent No. 21,392, dated August 31, 1858.

*To all whom it may concern:*

Be it known that I, GEORGE W. WEEKS, of Boston, in the county of Suffolk and Commonwealth of Massachusetts, have invented a new and useful Improvement in Ox-Yokes; and I do hereby declare that the following is a full, clear, and exact description of the construction and operation of the same, reference being had to the accompanying drawings, forming a part of this specification.

The nature of my invention consists in making the yoke and bows hollow, of iron or other suitable material, so as to be as light and strong as possible, and to accomplish the other purposes described below.

I do not confine myself to any particular shape of the yoke or bows, other than having them hollow, as the shape can obviously be varied at pleasure. I can either retain the common form of yoke, as seen in the Figure 1, or vary it so as to have a weight of metal only where it is absolutely necessary for strength, and by this means I produce a yoke which is light and durable, inasmuch as it is not liable to injury from exposure to rain or sun-shine and will never crack or split.

I furnish my yoke, made hollow, as represented in the Fig. 1, with holes, 1, 2, 3, 4, 5, 6, 7, to admit of a free circulation of the air. Of course the position and number of holes may be varied at pleasure. The bows, B, B, pass either through pipe boxes in the yoke or holes only in the top and bottom and are confined in any of the well-known ways. I make the bows of any hollow metal, but prefer malleable cast-iron or gas-pipe bent into the requisite shape and open at the top, as seen in the Fig. 1. Thus the bows are extremely strong, light, durable, and cool to the animal's neck.

The draft ring H, and link, F, may be confined to the yoke (as seen in Figs. 1 and 2,) by means of an adjustable bed-iron, C, and bolts, D, D', passing through the slot, $x$, and furnished with the nuts E E', at the top, or in any other suitable and convenient manner.

What I claim as my invention and desire to secure by Letters Patent is,

Making ox-bows and yokes, of iron or other suitable material, hollow, substantially as described, for the objects specified.

GEORGE W. WEEKS.

Witnesses:
N. AMES,
J. W. WEEKS.